United States Patent
Sauerbrey et al.

[19]

[11] Patent Number: 5,986,351

[45] Date of Patent: *Nov. 16, 1999

[54] BI-DIRECTIONAL LEVER FOR ACTIVATING AUTOMOTIVE LIFTGATE LOCK MECHANISM

[75] Inventors: Steven S. Sauerbrey, Farmington Hills; Shuxian Huang, Novi; Gerald S. McLean, Livonia, all of Mich.

[73] Assignee: Lear Automotive Dearborn, Inc., Southfield, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/947,791

[22] Filed: Oct. 9, 1997

[51] Int. Cl.⁶ .................................................. G05G 11/00
[52] U.S. Cl. .................. 307/10.1; 74/97.2; 292/DIG. 43; 318/10
[58] Field of Search ..................................... 74/471 R, 42, 74/43, 522; 15/250.19, 250.17, 256.5; 296/76, 76.15; 292/DIG. 25, DIG. 43, 201, 216, 341.16; 192/69.8, 698.2, 89.21; 70/237, 255, 258, 278; 307/9.1, 10.1; 318/443, DIG. 2, 4, 8, 9, 10, 14, 15

[56] References Cited

U.S. PATENT DOCUMENTS

| | | |
|---|---|---|
| 2,271,207 | 1/1942 | Rhein . |
| 2,345,778 | 4/1944 | Lammeren et al. . |
| 2,615,945 | 10/1952 | Jaeschke . |

(List continued on next page.)

FOREIGN PATENT DOCUMENTS

| | | |
|---|---|---|
| 0 345 002 A2 | 6/1989 | European Pat. Off. . |
| 0 478 013 A2 | 4/1992 | European Pat. Off. . |
| 1281424 | 12/1961 | France . |
| 822 178 | 11/1951 | Germany . |
| 28 16 207 A1 | 10/1979 | Germany . |
| 3807087 A1 | 9/1989 | Germany . |
| 39 23 688 A1 | 1/1991 | Germany . |
| 43 13 363 A1 | 11/1993 | Germany . |
| 42 19 211 A1 | 12/1993 | Germany . |
| 43 37 760 A1 | 5/1994 | Germany . |
| 56-22150 | 2/1981 | Japan . |
| 5-86761 | 6/1993 | Japan . |
| 2 048 362 | 12/1980 | United Kingdom . |
| 2 153 218 | 8/1985 | United Kingdom . |
| WO 96/33891 | 10/1996 | WIPO . |
| WO 96/33892 | 10/1996 | WIPO . |
| WO 96/33893 | 10/1996 | WIPO . |

OTHER PUBLICATIONS

PCT International Search Report dated Sep. 28, 1998.
"Goodheart–Wilcox Automotive Encyclopedia", William K. Toboldt, Larry Johnson, Steven W. Olive, 1989, pp. 723–727.
"Automotive Handbook", Bosch 3rd Edition, 1993, pp. 694–697.
"Kinematic Analysis of Mechanisms", 1959, J.E. Shigley, pp. 228–231.
"Genevamation Indexing Drives", Jan. 12, 1995 Catalog No. 693, Geneva Mechanisms Corporation.
"Saab 900 Owners Workshop Manual", Haynes Publishing Group, 1979 through 1985, pp. 172–174, 237.
Machine Design, "Basics of Design Engineering", Jun. 1992, Article "Mechanical Systems".
A paper from the Third Conference on Mechanisms, "A Survey of Intermittent–Motion", F.J.Borgardus, 1956, pp. 8–15.
Machine Design, Mechanisms for Intermittent Motion, Dec. 1951, Otto Lichtwitz, pp. 134–148.

(List continued on next page.)

Primary Examiner—Richard T. Elms
Attorney, Agent, or Firm—Harness, Dickey & Pierce, P.L.C.

[57] ABSTRACT

A bi-directional bypass lever assembly for activating an automotive liftgate lock mechanism includes a resetable spring-biased lever that is coupled to an automotive liftgate locking mechanism. The spring-biased lever resets itself automatically upon completion of both the locking mode and unlocking mode by the liftgate lock mechanism.

16 Claims, 6 Drawing Sheets

U.S. PATENT DOCUMENTS

| | | |
|---|---|---|
| 2,659,237 | 11/1953 | Wood . |
| 2,722,617 | 11/1955 | Cluwen et al. . |
| 2,953,802 | 9/1960 | Ziegler . |
| 2,959,803 | 11/1960 | Ziegler . |
| 3,163,791 | 12/1964 | Carlson . |
| 3,361,005 | 1/1968 | Carpenter . |
| 3,361,947 | 1/1968 | Schlebusch . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,516,610 | 6/1970 | Stevens . |
| 3,523,204 | 8/1970 | Rand . |
| 3,574,882 | 4/1971 | Petry . |
| 3,619,676 | 11/1971 | Kawakami . |
| 3,659,128 | 4/1972 | Danek . |
| 3,665,772 | 5/1972 | Beard et al. . |
| 3,688,332 | 9/1972 | Bellware . |
| 3,689,817 | 9/1972 | Elliott . |
| 3,694,723 | 9/1972 | Schneider et al. . |
| 3,803,627 | 4/1974 | Schuscheng . |
| 3,858,922 | 1/1975 | Yamanaka . |
| 3,917,330 | 11/1975 | Quantz . |
| 3,927,436 | 12/1975 | Inoue et al. . |
| 4,009,952 | 3/1977 | Badalich et al. . |
| 4,065,234 | 12/1977 | Yoshiyuki et al. . |
| 4,158,159 | 6/1979 | Orris et al. . |
| 4,173,055 | 11/1979 | Izumi et al. . |
| 4,183,114 | 1/1980 | Eden . |
| 4,259,624 | 3/1981 | Seibicke . |
| 4,271,381 | 6/1981 | Munz et al. . |
| 4,309,646 | 1/1982 | Liedtke et al. . |
| 4,336,482 | 6/1982 | Goertler et al. . |
| 4,352,299 | 10/1982 | Riggs et al. . |
| 4,422,522 | 12/1983 | Slavin et al. . |
| 4,434,678 | 3/1984 | Maus . |
| 4,450,390 | 5/1984 | Andrei-Alexandru et al. . |
| 4,478,004 | 10/1984 | Andrei-Alexandru et al. . |
| 4,492,904 | 1/1985 | Graham . |
| 4,507,711 | 3/1985 | Ono et al. . |
| 4,553,656 | 11/1995 | Lense . |
| 4,573,723 | 3/1986 | Morita et al. . |
| 4,630,178 | 12/1986 | Mugford et al. . |
| 4,639,065 | 1/1987 | Kohler et al. . |
| 4,660,698 | 4/1987 | Miura . |
| 4,674,781 | 6/1987 | Reece et al. . |
| 4,702,117 | 10/1987 | Tsutsumi et al. . |
| 4,733,147 | 3/1988 | Muller et al. . |
| 4,752,786 | 6/1988 | Inoue et al. ........................ 346/139 R |
| 4,816,083 | 3/1989 | Bangyan .............................. 137/271 |
| 4,875,053 | 10/1989 | Harada . |
| 4,878,398 | 11/1989 | Heinrich . |
| 4,885,512 | 12/1989 | Gille et al. . |
| 4,893,039 | 1/1990 | Isii . |
| 4,918,272 | 4/1990 | Nishikawa . |
| 5,007,131 | 4/1991 | Chevalier et al. . |
| 5,023,530 | 6/1991 | Ohashi et al. . |
| 5,045,741 | 9/1991 | Dvorsky . |
| 5,063,317 | 11/1991 | Bruhn . |
| 5,182,957 | 2/1993 | Bohmer et al. . |
| 5,214,440 | 5/1993 | Takahashi et al. . |
| 5,218,255 | 6/1993 | Horiguchi . |
| 5,222,775 | 6/1993 | Kato . |
| 5,228,239 | 7/1993 | Heo . |
| 5,251,114 | 10/1993 | Cantin et al. . |
| 5,274,875 | 1/1994 | Chou . |
| 5,291,109 | 3/1994 | Peter . |
| 5,315,735 | 5/1994 | I-Shin . |
| 5,333,351 | 8/1994 | Sato . |
| 5,355,061 | 10/1994 | Forhan . |
| 5,355,286 | 10/1994 | Flint . |
| 5,373,605 | 12/1994 | Austin . |
| 5,427,345 | 6/1995 | Yamakami et al. . |
| 5,462,337 | 10/1995 | Yamakami . |
| 5,519,258 | 5/1996 | Stroven et al. . |
| 5,528,959 | 6/1996 | Yamakami . |
| 5,691,586 | 11/1997 | Yonnet . |
| 5,694,812 | 12/1997 | Maue et al. ........................... 74/471 R |
| 5,730,028 | 3/1998 | Maue et al. ...................... 292/DIG. 43 |
| 5,764,010 | 6/1998 | Maue et al. .......................... 15/250.16 |
| 5,844,382 | 12/1998 | Dan .......................................... 318/10 |

OTHER PUBLICATIONS

"Mechanisms for Providing Intermittent Rotary Motion", Product Engineering, Aug. 1949, pp. 116–117.

Machine Design, Mechanisms for Intermittent Motion, "Part 2", Jan. 1952, Otto Lichtwitz, pp. 127–141.

Machine Design, Mechanisms for Intermittent Motion, "Part 3", Feb. 1952, Otto Lichtwitz, pp. 146–155.

Machine Design, Mechanisms for Intermittent Motion, "Part 4", Mar. 1952, Otto Lichtwitz, pp. 147–155.

A paper from the Third Conference on Mechanisms, "Designing for Intermittent Motion with Modified Starwheels", Karl E. Kist. pp. 16–20.

"Mechanisms for Engineering Design" "Motion, Circular, Intermittent", Chapter 3, S.B. Tuttle, John Wiley Co., pp. 33–51.

Machine Design, "Modifying Starwheel Mechanisms", Vandeman and Wood, Apr. 1953, pp. 255–261.

"Kinematics of Intermittent Mechanisms III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Multiplexed Node", Feb. 1996, H. Winston Maue, pp. 73–76.

Patent Abstracts of Japan, vol. 016, 7–438 (M–1309), Sep. 11, 1992 for JP Patent Publication No. 04151351 p. 100, *Machine Design*, 60 (1988) Oct. 13, No. 24, Cleveland, Ohio, US.

BI-DIRECTIONAL LEVER FOR ACTIVATING AUTOMOTIVE LIFTGATE LOCK MECHANISM

BACKGROUND OF THE INVENTION

This invention relates generally to a multi-purpose power transmission apparatus and specifically to a bi-directional bypass lever for use with an automotive vehicle intermittent motion mechanism that can be coupled to a windshield wiper arm, liftgate release/lock mechanism, or a window release lock mechanism.

It is customary for automotive vehicles to have one or more windshield wiper assemblies. Conventional assemblies include rubber wiper blades mounted upon claw brackets that are pivotally attached to wiper arms mounted upon a rotating shaft. A variety of methods have been utilized to activate the rotating shafts including using an electric motor which actuates a series or parallel-coupled four-bar linkage mechanism.

Sport-utility vehicles and minivans often employ a window wiper assembly for cleaning the rear window. Typically, these types of rear window wiper assemblies include a wiper blade mounted upon a bracket which is coupled to a wiper arm. The wiper arm is attached to a wiper shaft rotatably driven in a cyclicle oscillating manner by a helical gear. A reversible, fractional horsepower, directional current electric motor serves to actuate the helical gear through an armature shaft-mounted worm gear enmeshed therewith. An example of this type of rear window wiper arrangement is disclosed in U.S. Pat. No. 5,519,258 entitled "System and Method for Controlling Vehicle Liftgate Window Wiper".

It is also well known in minivans, station wagons, and sport-utility vehicles to employ a rear window release lock or latch that is actuated by a solenoid. The latch can be unlocked to allow for upward pivotal movement of the rear window in relation to the otherwise stationary liftgate. A separate liftgate lock can be mounted upon the liftgate door for fastening the liftgate to the body of the vehicle thereby preventing inadvertent opening of the liftgate. This liftgate lock is traditionally operated by manual key or handle rotation, or more recently through a separate electric motor or solenoid. It is also well known to provide a separate electric motor to operate a pump for providing fluid under pressure to the rear window for cleaning the same.

Separate motors or solenoids are commonly required to actuate the aforementioned locks, the wiper, and fluid pump. However, having multiple motors has increased vehicle weight and cost while further proving difficult to package within the often small spaces provided. This because the window wiper mechanism, rear window lock and liftgate lock and windshield wiper pump, as well as their motors, are all incorporated within the pivoting liftgate.

To overcome the aforementioned problems, a single electromagnetic device has been provided that selectively operates an intermittent motion mechanism coupled to a window wiper, a door lock, a window release lock, and the like. An example of such improvements can be found in WO 96/33891 entitled "Multi-Functional Apparatus Employing an Intermittent Motion Mechanism", WO 96/33892 entitled "Control System for an Automotive Vehicle Multi-Functional Apparatus", and WO 96/33893 entitled "Multi-Functional Apparatus Employing an Electromagnetic Device". These devices generally employ a geneva or starwheel-type mechanical construction for imparting rotational movement to an output pinion. WO 96/33891 specifically discloses an electric motor driving a main gear having a plurality of output devices connected thereto. Each such output device can be selectively activated depending upon whether the driver desires to activate the windshield wipers, liftgate release/lock mechanism, rear window release lock mechanism, or the like. It is desirable to minimize the number of components in the multi-functional apparatus including minimizing the number of gears, minimize the spacial requirements, and the cost of the multi-functional apparatus. It is also desirable to improve the method of engaging an external lever, for example, a lever going to the liftgate release/lock mechanism, so that it has smoother operation while maintaining robustness in the system. It is further desirable to have a resetable primary rotary lever that minimizes components, operates off of the primary gear, operates smoothly, and is quiet. It is also desirable to provide a resetable bi-directional primary lever for imparting motion to an external arm leading to a liftgate lock, or the like, that minimizes stresses on the system and hence, extends the life of the system.

SUMMARY OF THE INVENTION

Accordingly, it is an object of the present invention to provide an improved system wherein a single electromagnetic device can selectively operate an intermittent motion mechanism coupled to a window wiper, a door lock, a window release lock, and/or a fluid pump. The intermittent motion mechanism being similar to a gear box having a mechanism for imparting motion to and through an improved spring-biased lever that is connected to an external device such as a door lock mechanism.

In one aspect of the present invention, a bi-directional lever assembly for activating an automotive liftgate lock mechanism includes a drive member having an elongated shaft with a first end and a second end, the first end having an annular hub portion with a slot for receiving a spring and the second end having a flattened portion for receiving a rotatable member. The lever is journaled to the drive member. The lever is paddle-shaped wherein a tip has a pair of diverting arms extending therefrom with a semicircular base located at a distal end. An opening is located in the base for mating with the hub of the drive member. A spring is disposed between the drive member and the lever to reset the lever to a free position once the liftgate lock mechanism is either locked or unlocked.

Another aspect of the present invention includes a multi-functional apparatus driven by a motor. The multi-functional apparatus includes a housing encompassing a helical gear connected to the motor and a driven gear meshed with the helical gear. An intermittent mechanism is coupled to the driven gear for operating a wiper arm. A drive pin protruding from the driven gear selectively engages a second or third intermittent mechanism. The second intermittent mechanism is coupled to a window lock mechanism and is activated by the drive pin engaging a lever which in turn is coupled to the window lock mechanism. The third intermittent mechanism includes a spring biased lever rotatably coupled to an external lever coupled to a liftgate lock mechanism. The drive pin rotates the lever until the spring is overcome causing the external lever to rotate and engage the liftgate lock mechanism. When the drive pin rotates in the opposite direction, the lever is rotated to the point where the spring is overcome, thus causing the external arm to disengage the liftgate lock mechanism. In each instance, the lever resets to a free position once it clears the drive pin.

Additional advantages and features of the present invention will become apparent from the following description and appended claims, taken in conjunction with the accompanying drawings.

BRIEF DESCRIPTION OF THE DRAWINGS

FIG. 6 is a fragmented rear elevational view showing the lever in a free position;

FIG. 7 is a fragmented rear elevational view showing the lever rotated so that the spring clip is under a load;

FIG. 8 is a fragmented rear elevational view showing the lever rotated to its maximum up position causing the control arm to be in an upper liftgate unlock position;

FIG. 9 is a fragmented rear elevational view showing the lever disengaged from the drive pin, the spring clip unbiased and returned to its centered position, and the control arm maintained in a liftgate unlock position;

FIG. 10 is a fragmented rear elevational view showing the lever being rotated by the drive pin that is rotating clockwise and loading the spring clip;

FIG. 11 is a fragmented rear elevational view showing the lever in its down position and the control arm located in the liftgate lock position; and FIG. 12 is a fragmented rear elevational view showing the lever reset and disengaged from the drive pin, the spring clip relaxed while the control arm remains in the liftgate lock position.

DETAILED DESCRIPTION OF THE PREFERRED EMBODIMENT

Figure 1:
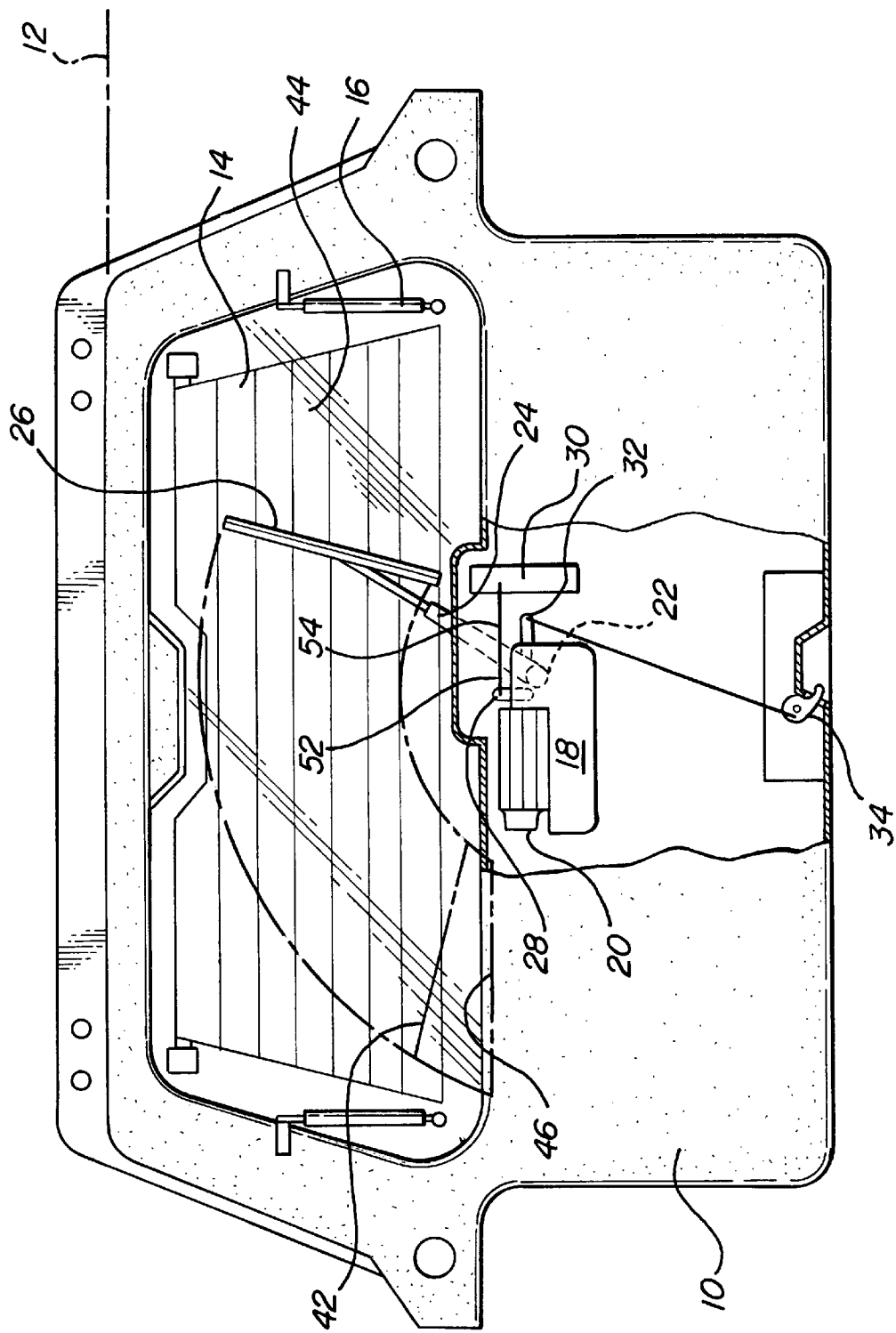
FIG. 1 is a front elevational view of a tailgate of a vehicle from the perspective of a passenger sitting in the vehicle looking out, showing various components connected to a multi-functional apparatus which contains the present invention.

With reference to FIG. 1, an automotive vehicle, such as a minivan, sport-utility vehicle, or the like, is illustrated having a rear liftgate door 10 which can pivot about a generally horizontal, hinging pivot axis 12. When the liftgate is pivoted to an open position a cargo space or passenger compartment is accessible from behind the vehicle. Pivotally connected to the liftgate 10 is a pop-up window 14 and a pair of pneumatic cylinders 16 serve to push the window 14 toward the open position when a lower portion of the window 14 is released.

Figure 2:
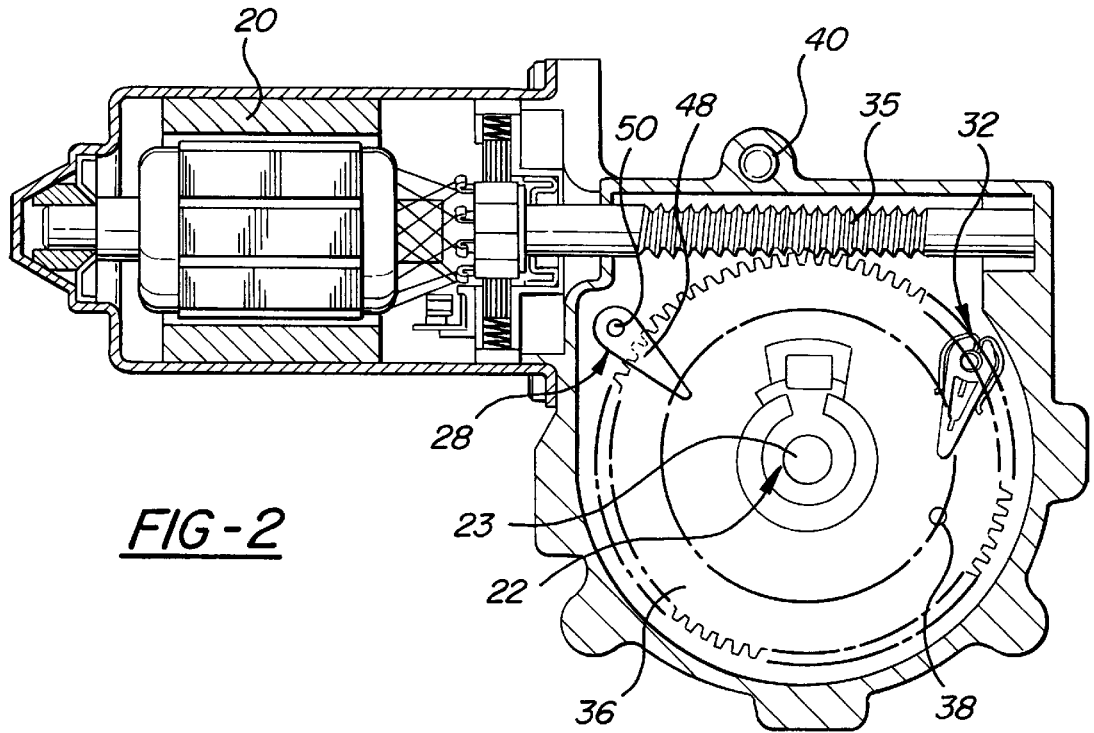
FIG. 2 is a partially fragmented, rear elevational view showing the bi-directional lever relative to the gear housing cover and electric motor.
Figure 3:
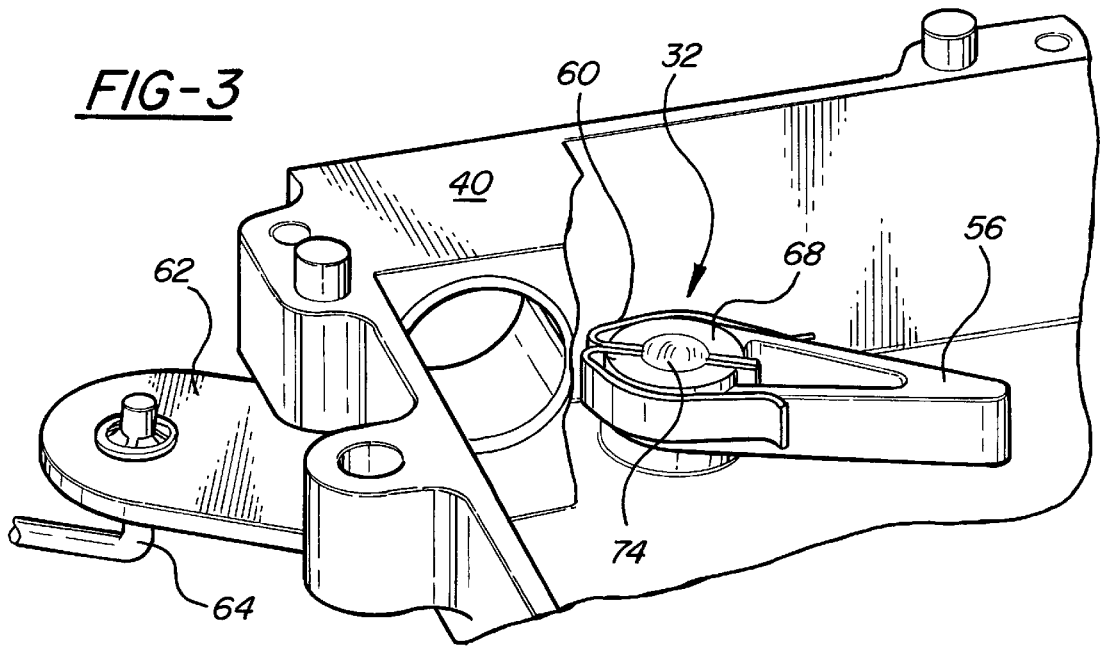
FIG. 3 is a partially exploded angled rear perspective view showing the bi-directional lever positioned within the housing.
Figure 4:
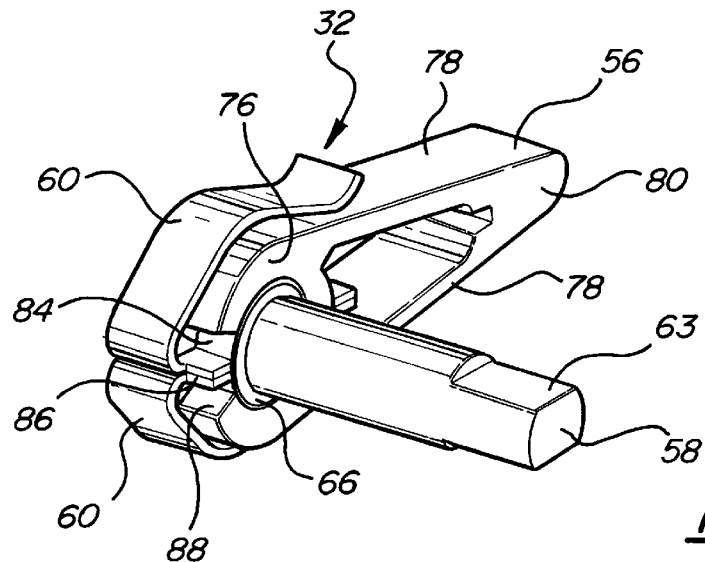
FIG. 4 is a perspective view of the bi-directional lever, spring clips and shaft assembled.

With reference to FIGS. 1 and 2, the preferred embodiment of the present invention includes a multi-functional apparatus that is secured to the inside surface of the liftgate 10 and is normally hidden by a trim panel that is shown broken away for illustrative purposes. The multi-functional apparatus 18 is a transmission-like device consisting of a plurality of output drive members driven by an electric motor 20. In the present invention, the multi-functional apparatus 18 has at least three outputs, each of which are driven by their own intermittent motion mechanism. The first intermittent motion mechanism 22 provides rotational movement to output pinion 23 that drives a wiper arm 24 and a wiper blade 26 connected thereto. The multi-functional apparatus 18 further includes a second intermittent motion mechanism 28 for selectively activating a window release lock mechanism 30. A third intermittent motion mechanism 32 selectively activates a liftgate release lock mechanism 34 so that the operator can selectively open the liftgate 10.

With continued reference to FIGS. 1 and 2, the aforementioned multi-functional apparatus 18 includes a fractional horsepower, direct current electric motor 20, a helical main gear 35, a driven gear 36, the first intermittent motion mechanism 22, and the output pinion 23, the second intermittent motion mechanism 28, the third intermittent motion mechanism 32, a drive pin 38 connected to the driven gear 36, and a gear box housing 40.

The window wiper shaft 23 is selectively coupled to gear 36 by way of first intermittent motion mechanism 22 for rotating the rear window wiper blade arm 26 in an oscillating manner between a first position 42 and a second position 44 on the window 14. Wiper shaft 23 and arm 24 are rotatable to a park position 46, removed from the window. When wiper blade 26 is in the park position 46, window 14 is free to open without interference of wiper 26.

The second intermittent motion mechanism 28 is operable to selectively activate the window release lock mechanism 30. This is accomplished by the drive pin 38 rotating to make contact with lever 48 that is journaled to shaft 50 which extends through a bore in the housing 40. Journaled to the other end of the shaft 50 is arm 52 (see FIG. 1) which, when advanced, causes connecting rod 54 to pivotally rotate a latch in the window release lock mechanism 30 to release the window 14 so that it can pivot upward. It will be appreciated that the drive pin 38 can be advanced a predetermined amount in order to control the extent of rotation of lever 48. To release the window lock mechanism 30, the lever 48 only needs to be rotated partially.

Figure 5:
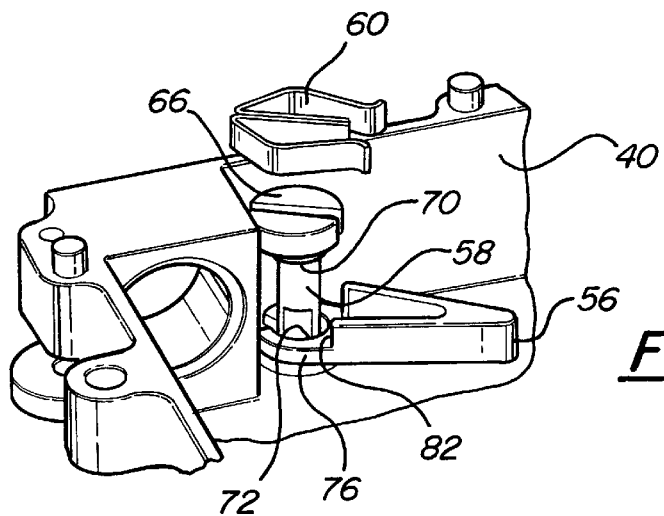
FIG. 5 is a perspective view of the exploded assembly of the present invention.

With reference to FIGS. 1–5, the liftgate release lock mechanism 34 is selectively coupled to the driven gear 36 by way of the third intermittent motion mechanism 32. The third intermittent mechanism 32 includes a rotatable lever 56 that is journaled to a distal end of a shaft 58, a pair of spring clips 60, and a control arm 62 journaled to the flattened end of shaft 58. A connecting rod 64 imparts motion to the liftgate release lock mechanism 34. With reference to FIG. 5, a cylindrically-shaped hub 66 is located at the distal end of shaft 58 for providing a mounting area for lever 56 to be secure thereto. It is preferred that the hub 66 be integrally molded to the shaft 58, but it will be appreciated that a separate hub 66 could be secured to the distal end of shaft 58. The shaft and hub are preferably made of plastic, but other materials could be used. Moreover, the gears and control arm are preferably made of plastic, and perhaps glass-filled. The hub 66 is bifurcated 68 substantially therethrough in order to receive the spring clips 60. An arcuate shaped protrusion 70 having a diameter smaller than the diameter of the hub 66 extends between the hub 66 and the shaft 58. This provides a shoulder that receives a bowl-shaped recess 72 formed within the lever 56. This allows the hub 66 and the lever 56 to nest and slidably rotate relative to one another. The spring clips 60 are held in place by welding, soldering, or otherwise providing a bead of material 74 on the distal end of shaft 58 to fuse the spring clips 60 in place relative to the shaft 58 and hub 66. It will be appreciated that other means can be used to secure the clips 60 in place, including using adhesives.

The spring clips 60 are preferably made of metal, perhaps spring steel, and are symmetrically shaped to conform to the external profile of the lever 56. The lever 56 is preferably made of a plastic material and has a circular mounting base 76 and a pair of arms 78 extending therefrom and converging to a distal tip 80. The base has a recess 82 that receives hub 66. An opening 84 in the mounting base 76 provides an access way for an inwardly extending portion 86 of the spring clips 60. The opening 84 provides approximately 38 degrees of rotation of the lever 56 relative to shaft 58 prior to the spring 60 bottoming out on edge 88 of the opening 80.

Figure 6:
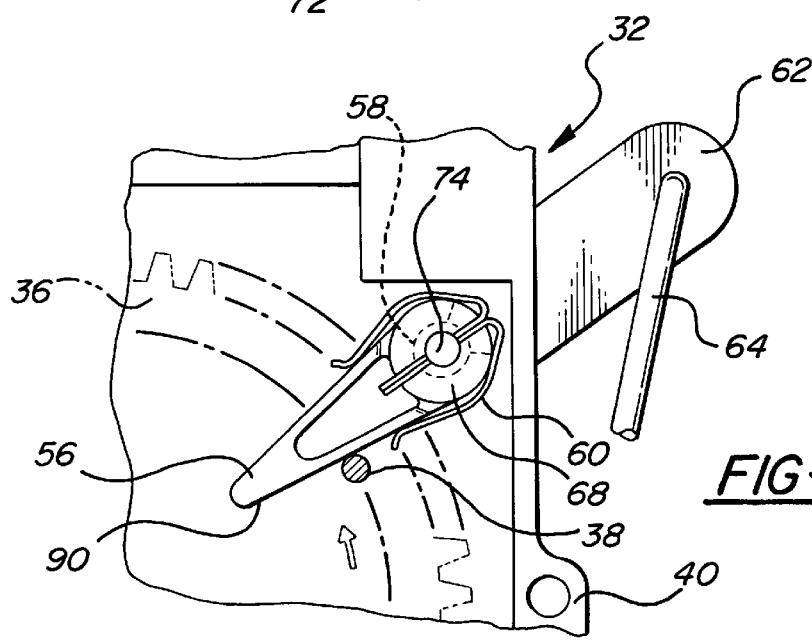
FIGS. 6–12 illustrate the various positions of the lever and the liftgate lock control arm.

FIGS. 6–12 depict the present invention in operation. In FIG. 6, the gear 36 is rotating in a counter clockwise direction thus causing drive pin 38 to make contact with the outer periphery or surface 90 of lever 56. This position represents the lever 56 in a free position where the spring clips 60 are not yet flexed and the control arm 62 is stationary.

Figure 7:
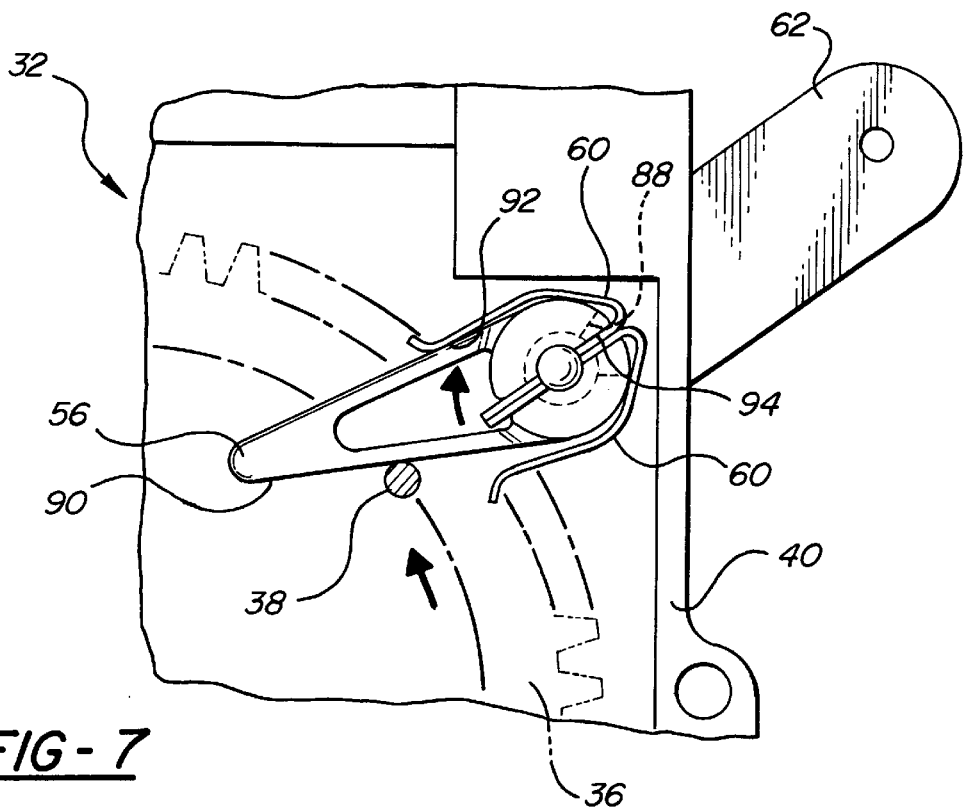

FIG. 7 represents a possible second position of the third intermittent mechanism 32 where the drive pin 38 advances in a counter clockwise direction proportional to the speed of gear 36. As the pin 38 rides along the surface 90 of the lever 56, the lever rotates in a clockwise rotation to cause outer surface 90 to engage the inner surface 92 of spring 60. At this position, exterior control arm 62 has not yet advanced to its downward position. The arm 62 preferably will not move until lever 56 has rotated in a clockwise direction to the point where portion 94 of the spring clip 60 has engaged edge 88 of the switch.

Figure 8:
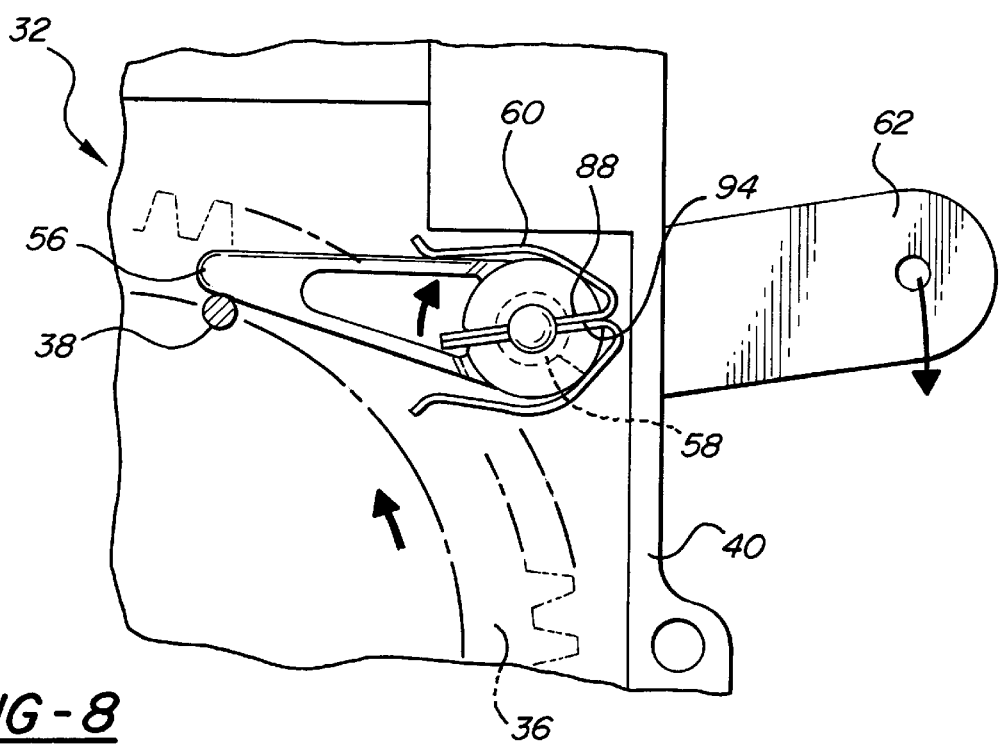

FIG. 8 illustrates a possible third position of the third intermittent mechanism 32 where the drive pin 38 has rotated the lever 56 to its uppermost position causing exterior arm 62 to rotate downward. At this position, the spring 60 is at its maximum biasing position and edge 88 of the lever 56 is pressed against portion 94 of the spring clip 60 causing the shaft 58 to rotate clockwise proportional to exterior arm 62.

Figure 9:
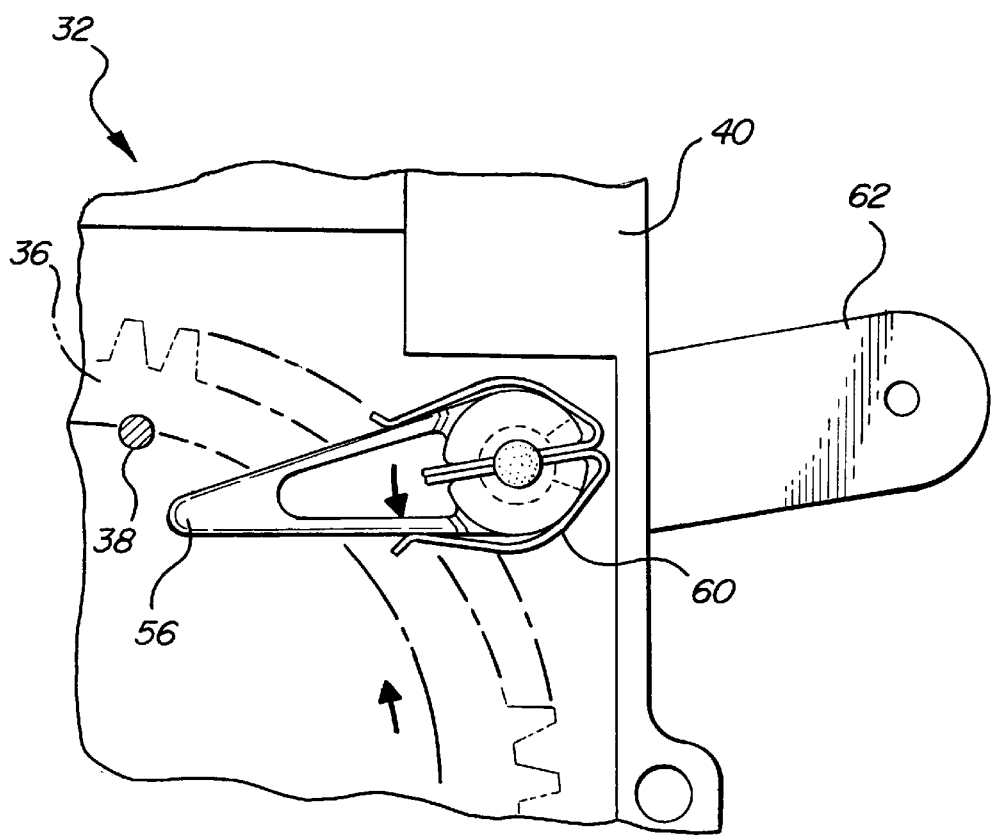

FIG. 9 illustrates a possible fourth position of the third intermittent mechanism 32 wherein the drive pin 38 has cleared the lever 56 and the biasing force of the spring clip 60 propels the lever 56 automatically counter clockwise back to its reset position. This re-setting feature allows the lever 56 to be properly oriented back to the free position as illustrated in FIG. 9. In this position, the exterior arm 62 does not move, yet the liftgate lock mechanism 34 remains in the unlocked position.

Figure 10:
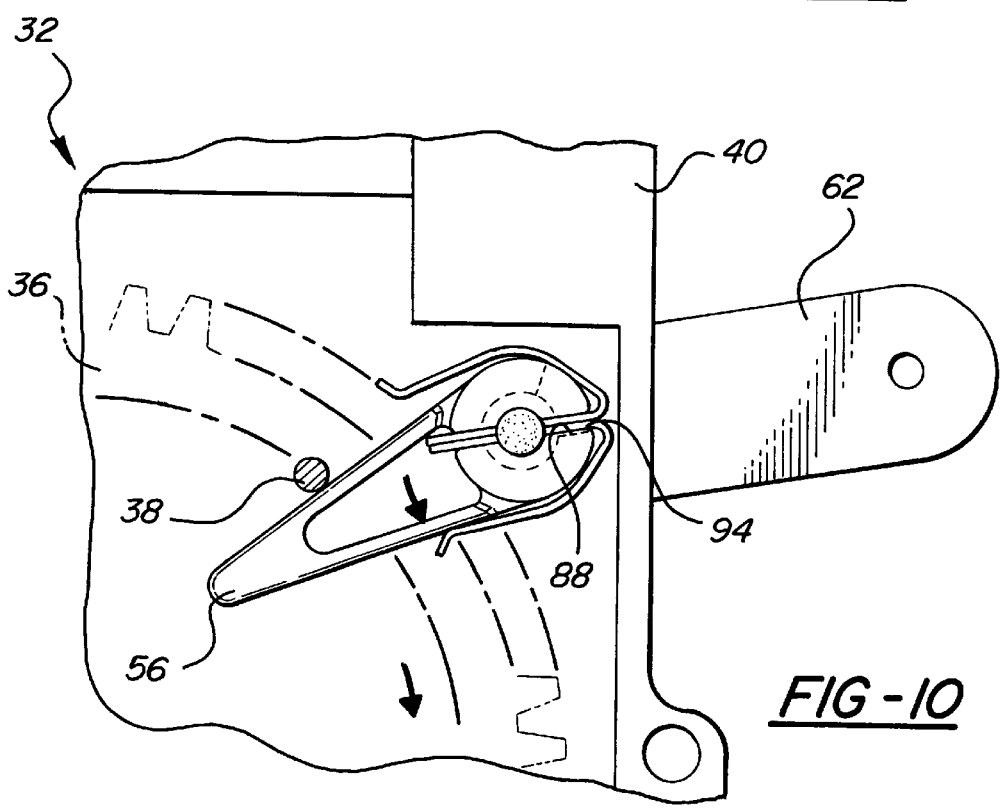

FIG. 10 illustrates a possible fifth position of the third intermittent mechanism 32 where depicted is the beginning of the process of unlocking the rear liftgate 10 by disengaging the lock mechanism 34. In this instance, the drive pin 38 engages the lever 56 as the gear 36 rotates in a clockwise direction. As the lever 56 rotates in a counter clockwise direction, the spring clip 60 begins to bias against the lever 56. The spring 60 will deflect for approximately 19 degrees of rotation of the lever 56 which is approximately when the portion 94 of the spring clip 60 will bear against edge 88 of the lever 56. No external arm 62 movement has yet occurred.

Figure 11:
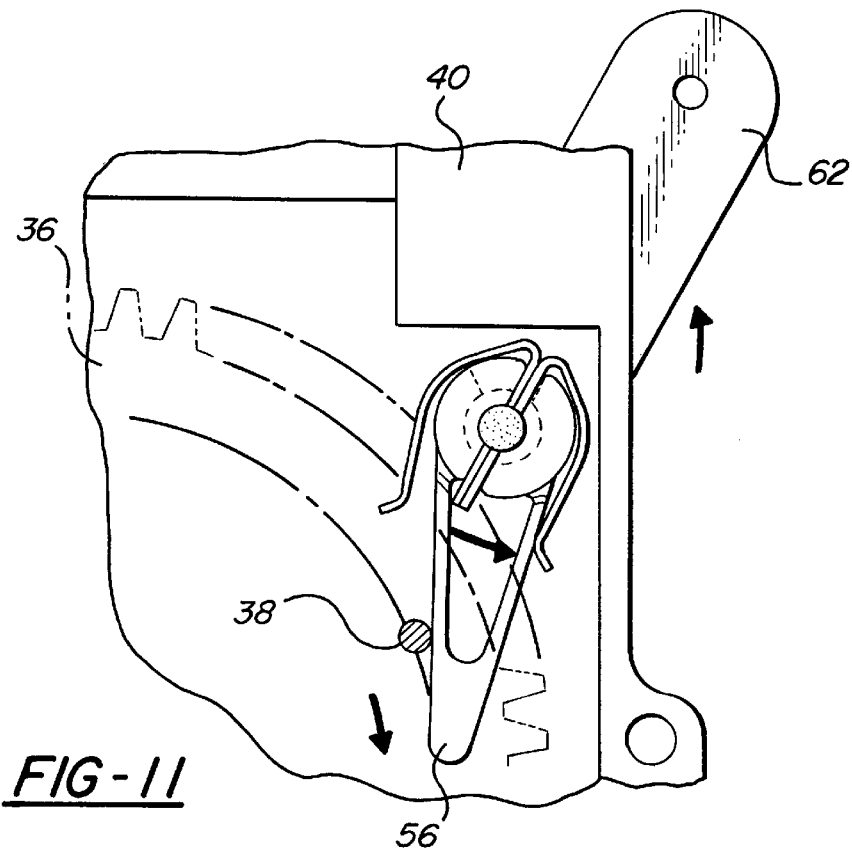
Figure 12:
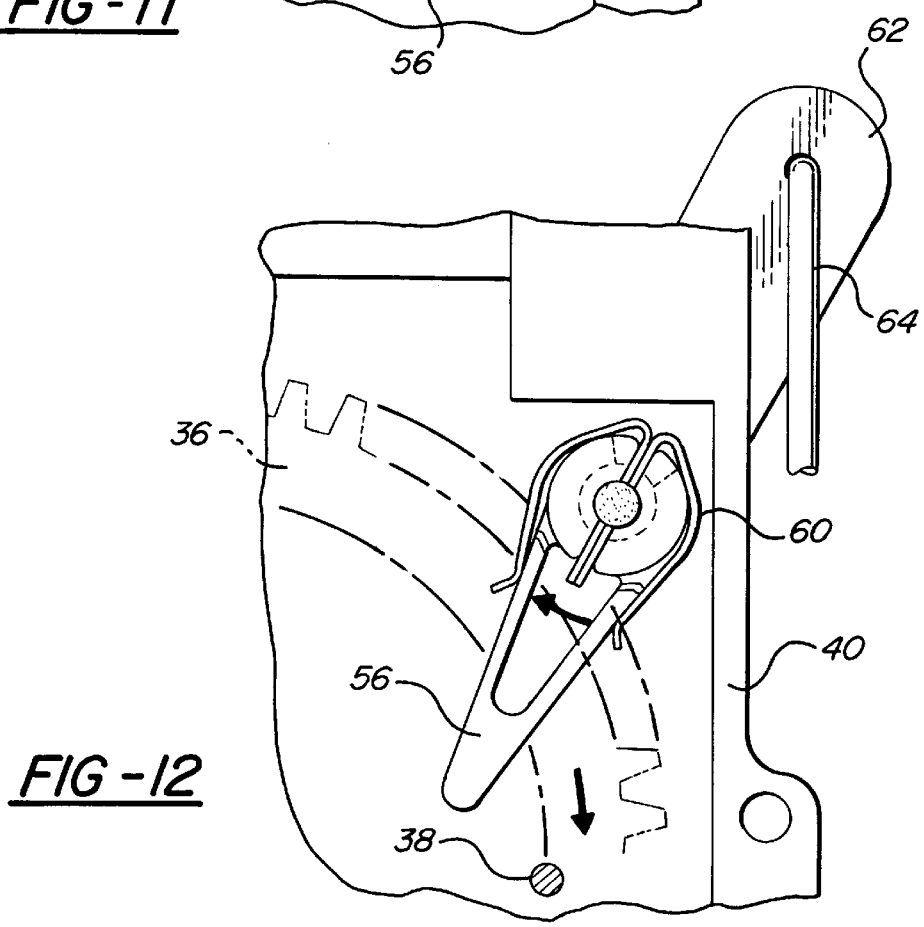

As illustrated in FIG. 11, spring 60 deflection is now complete and the motor 20 now begins to move the external linkage, i.e., arm 62 and rod 64. Such continues until the drive pin 38 moves away from the lever 56 and the lever resets. More specifically, at the point where the spring is at its maximum deflection (see FIG. 11), the lever 56 now rotates approximately 52 degrees because the drive pin 38 continues along its clockwise path pushing lever 56 to its downward position. This action causes exterior arm 62 to begin to rotate upward to its highest position which causes the connecting rod 64 to shift upward and engage the liftgate lock mechanism 34 into its locked position. The spring is at its maximum biased position and remains loaded until the drive pin 38 clears the lever 56 as illustrated in FIG. 12. The lever 56 automatically advances to its reset position because of the biasing forces exerting by the spring clips 60. The exterior arm 62 will remain in its upward position until the process is repeated. For example, to unlock the liftgate, the steps as described and depicted in FIGS. 6–9 will be used. To re-lock the liftgate, the steps and procedures described in connection with FIGS. 10–12 should be employed. It will be appreciated that based upon the type of liftgate locking mechanism 34 used, the steps for locking and unlocking said mechanism can be reversed, that is exterior arm 62 could be pushed downward to lock, and pushed upward to unlock the liftgate 10.

Various materials have been disclosed in an exemplary fashion, however, other materials may of course be employed. It is intended by the following claims to cover these and any other departures from the disclosed embodiments which fall within the true spirit of this invention.

The invention claimed is:

1. A bi-directional lever assembly for activating an automotive liftgate lock mechanism comprising:
   a drive member having an elongated shaft with a first end and a second end, the first end having an annular portion, the annular portion having a slot and a frustum shaped portion, the second end having a flat portion for receiving another member;
   a rotatable member journaled to the drive member, the rotatable member having a tip with a pair of diverging arms extending therefrom, the arms form a semicircular base at a distal end, the base having an opening to provide rotational movement; and
   a biasing member having an angled segment connected to the drive member for resetting the rotatable member to a desirable position.

2. The bi-directional lever assembly of claim 1 further comprising a retaining member for securing the biasing member to the drive member.

3. A multi-functional apparatus for an automotive vehicle, said apparatus comprising:
   an electric motor;
   a housing connected to said motor;
   a first gear connected to said motor and extending into said housing;
   a driven gear meshed with said first gear, said driven gear located within said housing;
   a driving surface protruding from said driven gear;
   a first intermittent motion mechanism selectively driven by one of said gears for selectively operating a first device;
   a second intermittent motion mechanism selectively driven by one of said gears for selectively operating a second device; and
   at least a section of a biasing member externally mounted to at least one of said mechanisms for biasing said mechanism from a first orientation to a second orientation.

4. The multi-functional apparatus of claim 3 wherein at least one of said intermittent motion mechanisms includes an elongated lever connecting to a drive member, a lock mechanism coupled to said lever, and a spring being operable to reset said lever at a predetermined position after said lever is moved therefrom.

5. The multi-functional apparatus of claim 4 further comprising a substantially circular hub rotatably coupled to said lever, said driving surface of said driven gear operably contacting against an edge of said lever, and a pivot pin coupling said hub to said housing.

6. The multi-functional apparatus of claim 3 wherein said first intermittent motion mechanism includes:

an elongated shaft;

a lever rotatably journaled to one end of said shaft;

said one end of said shaft including a hub, a contoured second end of said shaft extending through said housing; and an arm connected to said contoured end of said shaft.

7. The multi-functional apparatus of claim 3 further comprising a third intermittent motion mechanism including a lever connecting to a shaft that is rotatable relative to said housing, a biasing member operably returning said lever to a predetermined position, and means for securing said biasing member relative to said lever.

8. The multi-functional apparatus of claim 7 wherein said biasing member has a substantially W-shape for biasing said first intermittent motion mechanism toward a desired orientation.

9. The multi-functional apparatus of claim 3 wherein said first device is a wiper assembly.

10. The multi-functional apparatus of claim 3 wherein said second device is a window release mechanism.

11. The multi-functional apparatus as claimed in claim 3 wherein one of said devices is a lock.

12. A bi-directional apparatus for use in an automotive vehicle, said apparatus comprising:

a drive member having an elongated shaft with an annular portion, said annular portion having a slot;

a rotatable member coupled to said drive member, said rotatable member having a tip, a pair of diverging external surfaces of said rotatable member extending from said tip, a base of said rotatable member having an opening to receive said elongated shaft; and a biasing member having an angled segment, said biasing member being connected to said drive member and said rotatable member, said biasing member operably serving to bias said rotatable member to a desirable position.

13. The bi-directional apparatus of claim 12 further comprising a retainer securing said biasing member to said drive member.

14. The bi-directional apparatus of claim 12 wherein said biasing member has a substantially W-shape.

15. The bi-directional apparatus of claim 12 further comprising an arm coupled to an end of said drive member opposite said slot, and a lock mechanism coupled to said arm.

16. The bi-directional apparatus of claim 12 further comprising an electric motor, a gear operably driven by said electric motor, and an abutting member moving with said gear operably abutting against one of said external surfaces of said rotatable member for moving said drive member.

* * * * *